United States Patent [19]

Calabrese

[11] Patent Number: 4,703,451
[45] Date of Patent: Oct. 27, 1987

[54] DATA RELAY SYSTEM

[76] Inventor: Frank A. Calabrese, 118 S. Broad, Waynesboro, Pa. 17268

[21] Appl. No.: 894,083

[22] Filed: Aug. 6, 1986

Related U.S. Application Data

[63] Continuation of Ser. No. 488,000, May 2, 1983.

[51] Int. Cl.$^4$ ............................. G06F 13/00
[52] U.S. Cl. ..................... 364/900; 340/825.07; 340/825.15; 340/825.52
[58] Field of Search ... 364/200 MS File, 900 MS File; 340/825.18; 1/2

[56] References Cited

U.S. PATENT DOCUMENTS

| | | | |
|---|---|---|---|
| 3,697,959 | 10/1972 | Abramson et al. | 364/200 |
| 3,732,543 | 5/1973 | Rocher et al. | 370/88 |
| 3,755,786 | 8/1973 | Dixon et al. | |
| 3,755,789 | 8/1973 | Collins | 364/200 |
| 3,813,651 | 5/1974 | Yamada | 364/200 |
| 3,859,468 | 1/1975 | Smith et al. | 370/86 |
| 3,863,220 | 1/1975 | Osawa et al. | 370/86 |
| 3,879,710 | 4/1975 | Maxemchuck et al. | 364/200 |
| 3,891,804 | 6/1975 | Hachenburg | 370/86 |
| 3,921,137 | 11/1975 | McClearn, Jr. et al. | 370/86 |
| 3,943,283 | 3/1976 | Caragliano et al. | 370/86 |
| 3,958,226 | 5/1976 | Kuroda | 364/200 |
| 3,961,139 | 6/1976 | Bowman et al. | 370/89 |
| 4,002,842 | 1/1977 | Meyr et al. | 179/15 AL |
| 4,006,465 | 2/1977 | Cross et al. | 364/200 |
| 4,016,379 | 4/1977 | Pedersen | 370/92 |
| 4,019,176 | 4/1977 | Cour et al. | 364/900 |
| 4,023,140 | 5/1977 | Siems et al. | 340/151 |
| 4,071,706 | 1/1978 | Warren | 370/89 |
| 4,078,228 | 3/1978 | Miyazaki | 340/147 R |
| 4,144,410 | 3/1979 | Flickinger | 179/15 AL |
| 4,159,470 | 6/1979 | Strojny et al. | 179/175.2 C |
| 4,161,634 | 7/1979 | Bellisio | 370/90 |
| 4,195,351 | 3/1980 | Barner | 364/900 |
| 4,212,080 | 7/1980 | Milliken | 364/900 |
| 4,271,506 | 6/1981 | Broc et al. | 370/13 |
| 4,287,592 | 9/1981 | Paulish | 370/88 |
| 4,322,849 | 3/1982 | Calabrese | 375/3 |
| 4,328,559 | 5/1982 | Markhasin | 364/900 |
| 4,354,226 | 10/1982 | Flickinger | 364/200 |
| 4,383,314 | 5/1983 | Tam | 370/86 |
| 4,401,470 | 8/1977 | Slane et al. | 364/900 |
| 4,434,463 | 2/1984 | Quinquis et al. | 340/825.18 |

Primary Examiner—Archie E. Williams, Jr.
Assistant Examiner—Emily Y. Chan
Attorney, Agent, or Firm—Spencer T. Smith

[57] ABSTRACT

A data relay system includes a plurality of data relays. Addresses are transmitted in one direction serially to each data relay and data is transmitted in the other direction serially through the data relays. Each data relay reinforces the data and address.

2 Claims, 2 Drawing Figures

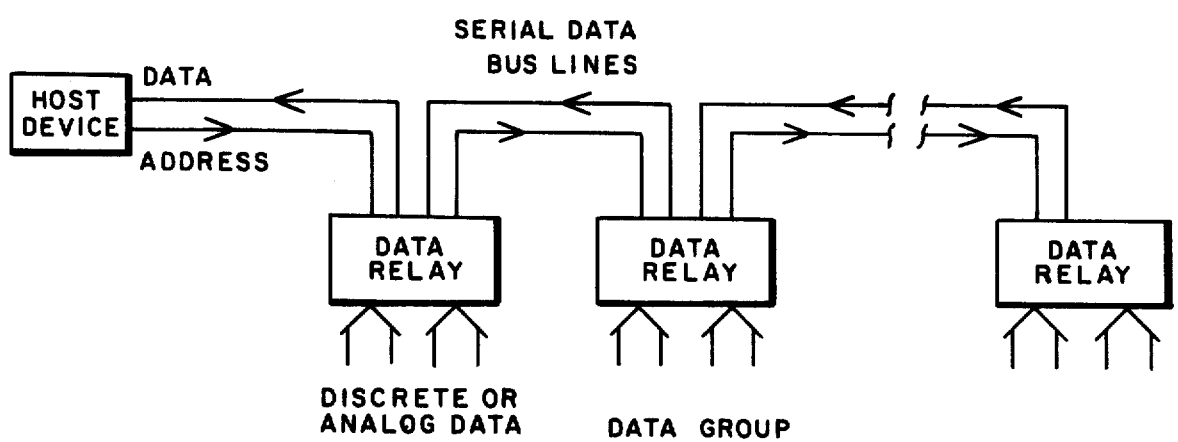
Fig_1

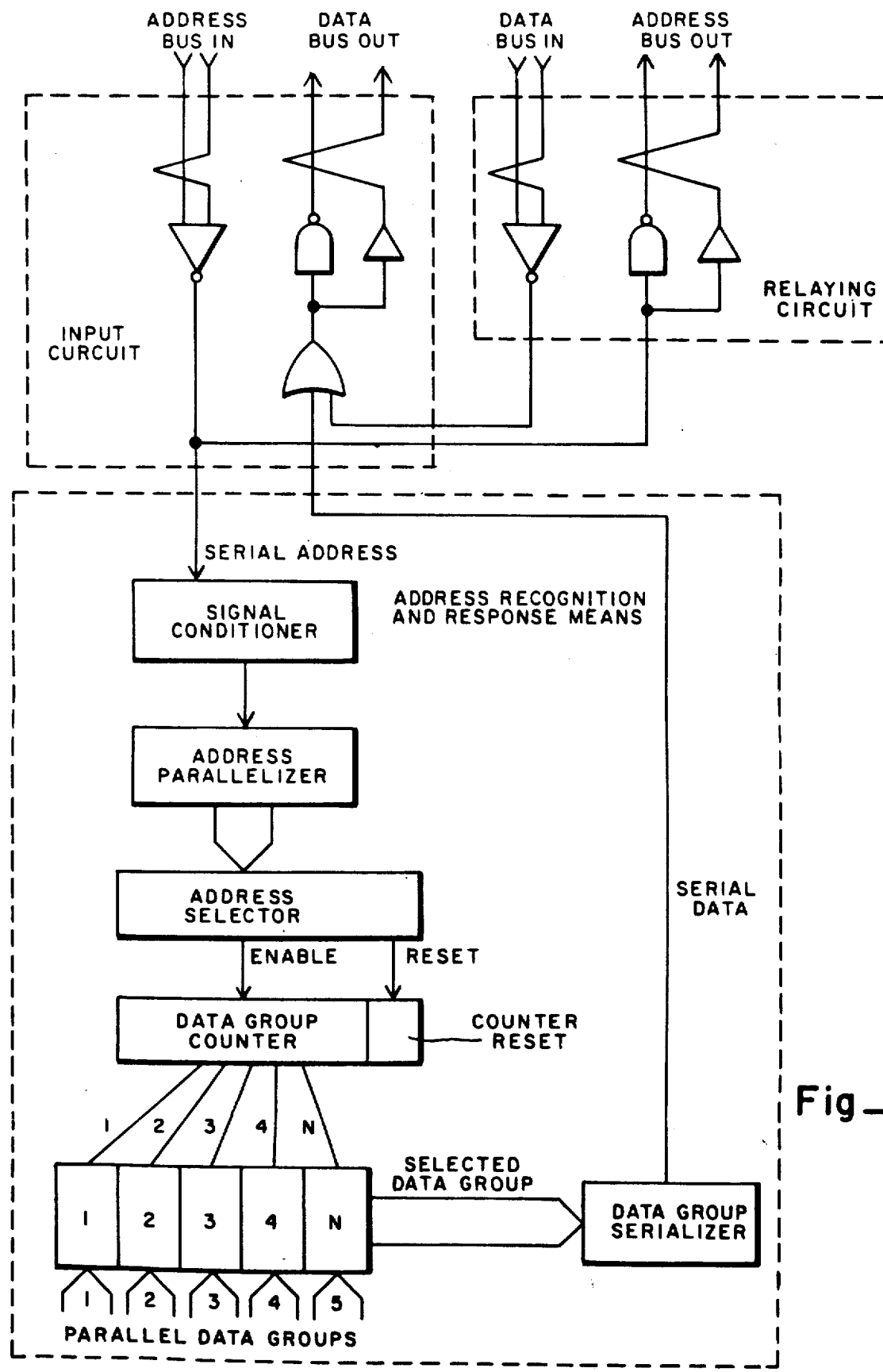
Fig_2

DATA RELAY SYSTEM

This is a continuation of co-pending application Ser. No. 488,000 filed on May 2, 1983, now abandoned, which is a continuation of Ser. No. 140,212 filed on Apr. 14, 1980, now abandoned.

BACKGROUND OF THE INVENTION

The present invention relates to a data relay system for accessing large quantities of data, of any voltage level, either discrete or analog, from a single source or host device, typically a computer.

Typical approaches to accessing data by a computer may be parallel or serial. When utilizing the parallel method, a special interface device must be custom designed to the specific requirements of each computer. Each data point must be individually wired to the parallel interface.

Each data bit corresponds to a computer input bit which limits the capacity of the system interface. The parallel interface must be in the vicinity of the computer to reduce the interference effects of electrical noise. When utilizing serial interfacing, each serial channel is customarily interfaced to a single device which preconditions the data electrically. Serial interfacing above the simplest level requires communication protocols by the computer for selecting the correct data. The range of the remote data acquisition is often restricted by the electrical conditioning of the serial line.

SUMMARY OF THE INVENTION

It is, accordingly, an object of the present invention to provide a data relay system which eliminates these constraints.

An advantage of the present invention is that data acquisition requires no special protocol.

Another advantage of the present invention is that the number of data relay units which may be connected to a single serial channel is limited only by the addressing scheme chosen for the data relay system and the remoteness or quantity of the data relays does not affect system performance.

Other objects and advantages of the present invention will become apparent from the following portion of this specification and from the accompanying drawings which illustrate, in accordance with the mandate of the patent statutes, a presently preferred embodiment incorporating the principals of the invention.

BRIEF DESCRIPTION OF THE DRAWING

FIG. 1 is a block diagram for a data relay system made in accordance with the teachings of the present invention; and FIG. 2 is a schematic diagram of a data relay illustrated in FIG. 1.

DESCRIPTION OF THE PREFERRED EMBODIMENT

Multiple Data Relay units (FIG. 1) are serially connected to a single Serial Data channel so that each data relay sees the address placed on the serial address by the Host Device line in sequence. Since each Data Relay has a unique address, only one responds by placing data on the Data line.

Serial addresses placed on the Address Bus, shown in FIG. 1, by a Host Device, such as a computer, are processed by an Input Circuit (FIG. 2) and received by the Signal Conditioner of the first serially related Data Relay. The conditioned serial address is converted to parallel by the Address Parallelizer, which presents the parallel address to the Address Selector. If the address enable is recognized by the Address Selector, then a Data Group is counted (sequenced) by the Data Group Counter while the Data Group is enbaled. Enabling a selected Data Group results in that selected parallel data being supplied to the Data Group Serializer which presents the parallel data for serial transmission to the Host Device through and reinforced by the Input Circuit.

Each time the Address Selector enables a Data Group, the Data Group Counter indexes to the next sequential Data Group. When all Data Groups have been selected or when a reset signal is received, the Data Group Counter will reset to the first Data Group.

An address received at the Address Bus In is simultaneously decoded by the Data Relay and to the next serially related Data Relay through the relaying circuit which reinforces the address. An address will serially be directed to each of the serially related Data Relays even though the address corresponds, for example, to the very first Data Relay.

Only one data relay with the unique address code will transmit data from the Data Group Serializer through the input circuit where it will be reinforced and serially in upstream directed through the relaying and input circuits of each Data Relay between the addressed Data Relay and the Host Device.

The input circuit includes an OR gate thereby assuring that only one Data Relay transmits data on the Address Bus at a time.

Signal transmissions from the controlling devices to the Data Relays and from the Data Relays back to the controlling device are accomplished without degradation. The remoteness or quantity of the Data Relays, accordingly, do not affect system performance.

The invention claimed is:

1. A data communicating system comprising
host means for transmitting a plurality of different addresses,
a plurality of serially connected data relay means each being interfaced to a data source for acquiring data from the data source and transmitting the data to said host means, each of said data relay means including
means for storing one of said addresses to identify said data relay means,
address input means for receiving each of said addresses originally transmitted by said host means,
address output means for reinforcing each of said received addresses and transmitting each reinforced address downstream to the address input means of the next downstream data relay means,
unidirectional data output means for reinforcing and transmitting data to the next upstream data relay means,
data input means for receiving data transmitted by the unidirectional data output means of the next downstream data relay means and routing said data to said unidirectional data output means of this data relay means, and
address selector means responsive to said stored address for transmitting the data from the data source to said unidirectional data output means.

2. A data communication system as set forth in claim 1 wherein said host means is connected to the most upstream one of said data relay means and is adapted to transmit said addresses downstream to said most upstream data relay means and receive said data tansmitted upstream by said most upstream data relay means.

* * * * *